US011660970B2

(12) United States Patent
Chen et al.

(10) Patent No.: US 11,660,970 B2
(45) Date of Patent: May 30, 2023

(54) ON-BOARD LIQUID-COOLED OR GAS-COOLED CHARGING CABLE FOR ELECTRIC VEHICLES

(71) Applicant: Byton Limited, Hong Kong (HK)

(72) Inventors: Peng Chen, San Jose, CA (US); Shawn Slovesko, Santa Clara, CA (US); Orlando Reyes, Fremont, CA (US); Christopher Eckert, San Jose, CA (US)

( * ) Notice: Subject to any disclaimer, the term of this patent is extended or adjusted under 35 U.S.C. 154(b) by 411 days.

(21) Appl. No.: 15/863,840

(22) Filed: Jan. 5, 2018

(65) Prior Publication Data

US 2019/0214161 A1 Jul. 11, 2019

(51) Int. Cl.
*H01B 7/42* (2006.01)
*B60L 11/18* (2006.01)
(Continued)

(52) U.S. Cl.
CPC ............... *B60L 50/64* (2019.02); *B60L 53/16* (2019.02); *B60L 53/18* (2019.02); *B60L 53/22* (2019.02);
(Continued)

(58) Field of Classification Search
CPC .......... H01B 7/423; H01B 7/42; H01B 9/006; H01B 9/00; H01B 9/0605; H01B 9/0622;
(Continued)

(56) References Cited

U.S. PATENT DOCUMENTS 2,253,984 A * 8/1941 Shanklin ................. H02G 15/24
156/48
3,739,073 A * 6/1973 Schneider .............. H02G 15/06
174/23 R
(Continued)

FOREIGN PATENT DOCUMENTS

EP 0823766 A1 2/1998
EP 0823767 A1 2/1998
(Continued)

OTHER PUBLICATIONS

The International Search Report for counterpart PCT Application No. PCT/US2018/052308 dated Dec. 14, 2018, 4 pages.
(Continued)

*Primary Examiner* — Richard Isla
(74) *Attorney, Agent, or Firm* — Womble Bond Dickinson (US) LLP

(57) ABSTRACT

Embodiments of a liquid-cooled charging cable are described. The charging cable includes one or more electrically conductive cables having a first end and a second end. Each cable has a set of one or more cooling tubes. Each cooling tube includes an inlet and an outlet, both at the first end of the cable, a forward part in thermal contact with the cable, the forward part beginning at the inlet and extending from the first end to the second end, and a reverse part in thermal contact with the cable, the reverse part extending from the second end to the first end and ending at the outlet. The forward and reverse parts together form a continuous fluid path between the inlet and the outlet, so that a working
(Continued)

fluid can flow through each cooling tube from the inlet through the forward part and the reverse part to the outlet.

46 Claims, 8 Drawing Sheets

(51) Int. Cl.
  *H01B 9/00* (2006.01)
  *H01R 13/00* (2006.01)
  *B60L 50/64* (2019.01)
  *B60L 53/22* (2019.01)
  *B60L 53/18* (2019.01)
  *B60L 53/16* (2019.01)

(52) U.S. Cl.
  CPC ............. *H01B 7/423* (2013.01); *H01B 9/006* (2013.01); *H01R 13/005* (2013.01)

(58) Field of Classification Search
  CPC . H01B 9/0638; H01B 9/0677; B60L 11/1818; B60L 11/15; B60L 50/50; B60L 53/22; B60L 53/18; B60L 2230/12; B60L 53/302; H01R 13/005; H01R 13/00
  USPC .......................................................... 320/109
  See application file for complete search history.

(56) References Cited

U.S. PATENT DOCUMENTS

| | | | | |
|---|---|---|---|---|
| 3,773,965 | A * | 11/1973 | Reynolds | B32B 27/304 174/25 G |
| 5,647,450 | A * | 7/1997 | Ogawa | B60L 58/26 180/220 |
| 5,909,099 | A * | 6/1999 | Watanabe | B60L 53/34 320/108 |
| 2007/0019708 | A1 * | 1/2007 | Shiflett | C09K 5/047 374/181 |
| 2011/0269008 | A1 * | 11/2011 | Houchin-Miller | B60L 58/26 429/120 |
| 2014/0247018 | A1 * | 9/2014 | Kikuchi | H01M 10/486 320/150 |
| 2014/0339009 | A1 | 11/2014 | Suzuki et al. | |
| 2015/0054460 | A1 * | 2/2015 | Epstein | B60L 58/26 320/109 |
| 2015/0217654 | A1 * | 8/2015 | Woo | B60L 53/302 320/109 |
| 2016/0144737 | A1 * | 5/2016 | Liu | H02J 7/04 320/149 |
| 2016/0195435 | A1 * | 7/2016 | Krueger | H01R 13/6683 374/184 |
| 2017/0338006 | A1 * | 11/2017 | Gontarz | H01R 13/005 |

FOREIGN PATENT DOCUMENTS

| | | |
|---|---|---|
| JP | 2000133058 A | 5/2000 |
| WO | 2017133893 A1 | 8/2017 |
| WO | 2017201017 A2 | 11/2017 |

OTHER PUBLICATIONS

Written Opinion of The International Searching Authority for counterpart PCT Application No. PCT/US2018/052308 dated Dec. 14, 2018, 8 pages.

PCT International Preliminary Report on Patentability for counterpart PCT Application No. PCT/US2018/052308 dated Jul. 16, 2020, 10 pages.

Office Action for Chinese Patent Application No. 201820260796.8, dated Aug. 29, 2018, 4 pages.

* cited by examiner

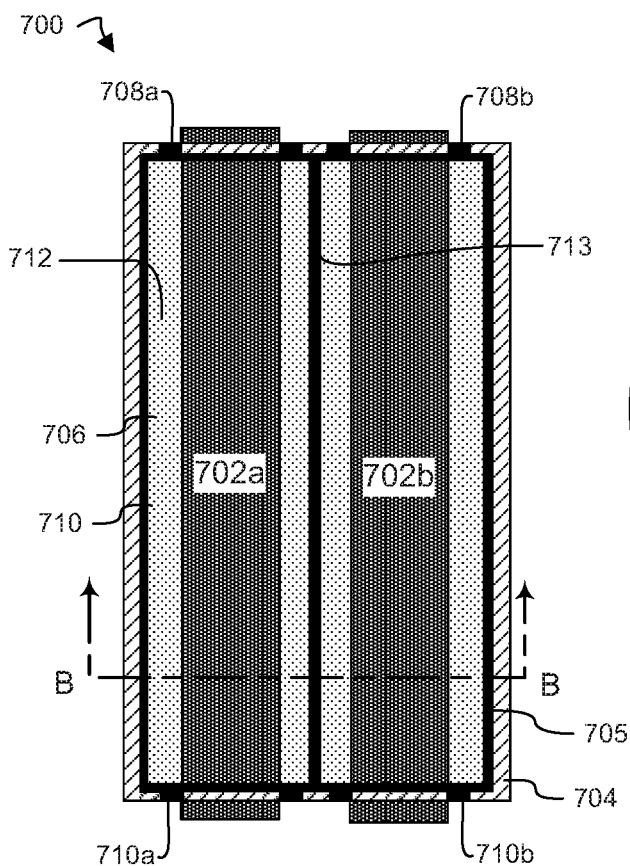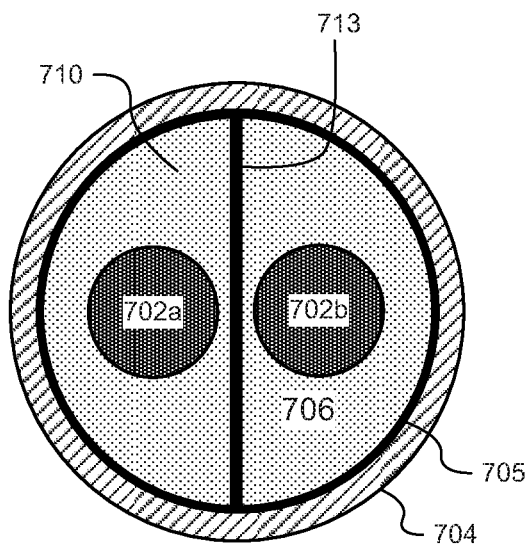
*Fig. 7A*  *Fig. 7B*
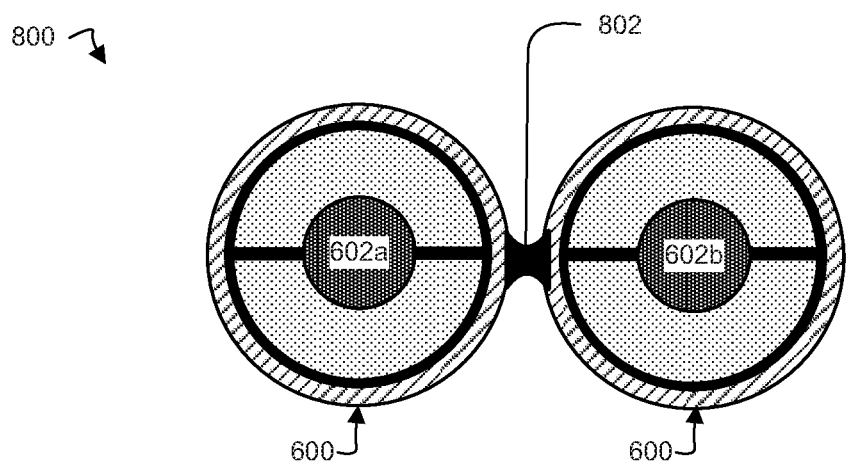
*Fig. 8*

ON-BOARD LIQUID-COOLED OR GAS-COOLED CHARGING CABLE FOR ELECTRIC VEHICLES

TECHNICAL FIELD

The disclosed embodiments relate generally to charging cables and in particular, but not exclusively, to a liquid-cooled charging cable.

BACKGROUND

Gas-powered vehicles are slowly being replaced by vehicles that are partially or wholly electrically powered. Until now the move to electrically-powered vehicles has been limited to passenger vehicles, but manufacturers like Tesla already have commercial vehicles such as trucks in the works. Some governments have mandated a complete transition to electrically powered vehicles by a certain year.

Despite the apparent inevitability of electric vehicles, obstacles remain to their widespread adoption. All electric vehicles use batteries to provide electrical power to the motors that drive them, and these batteries all require charging after a certain period of operation. One obstacle to adoption has been the time needed to charge the vehicle's batteries after they are depleted. Charging an electric vehicle's batteries is significantly slower than putting gasoline in a gas-powered vehicle; to make electric vehicles competitive with gas-powered ones, battery charging time must be decreased. To reduce battery charging time, electric vehicle manufacturers have developed charging stations that operate at very high currents, for instance currents around 350 A. This has brought down the charging time for a vehicle battery to between 30 minutes and 1 hour, which is a substantial improvement.

But although charging at high currents substantially reduces charging time, it creates several collateral problems. Among other things, high currents require a conductor with a large cross-sectional area; to adequately conduct 350 A, a copper cable must have a diameter of 70-95 mm, making it heavy. And, with the current price of copper, if the conductor is of any length it will be expensive. Other materials such as aluminum can be used, but they suffer from other disadvantages. Another problem is that carrying such high currents makes a conductor very hot. Among other things, the heat increases the conductor's electrical resistance and reduces its charging efficiency. And the heating and cooling cycles that the cable undergoes in its lifetime—and the corresponding thermal expansion and contraction cycles—create stresses in the parts to which the cable is connected, thus decreasing their lifetime. Finally, the high temperatures of the cable can be a safety hazard to the user.

SUMMARY

Embodiments of a liquid-cooled charging cable are described. The charging cable includes one or more cables, each cable being electrically conductive and having a first end and a second end. A set of cooling tubes corresponds to each cable, each set including one or more cooling tubes. Each cooling tube includes an inlet and an outlet, both at the first end of the cable, a forward part in thermal contact with the cable, the forward part beginning at the inlet and extending from the first end to the second end, and a reverse part in thermal contact with the cable, the reverse part extending from the second end to the first end and ending at the outlet. The forward part and the reverse part together form a continuous fluid path between the inlet and the outlet, so that a working fluid can flow through each cooling tube from the inlet through the forward part and the reverse part to the outlet. Other embodiments are described and claimed.

Embodiments of a vehicle including a liquid-cooled charging cable are also described. The vehicle includes a drivetrain with one or more electric motors coupled to at least one of the vehicle's wheels. A battery is mounted in the vehicle and electrically coupled to the one or more electric motors, and a charging cable is mounted in the vehicle and electrically coupled between the battery and a charging port on the vehicle exterior. The charging cable comprises one or more cables, each cable being electrically conductive and having a first end and a second end. A set of cooling tubes corresponds to each cable, each set including one or more cooling tubes. Each cooling tube includes an inlet and an outlet, both positioned at the first end of the cable, a forward part in thermal contact with the cable, the forward part beginning at the inlet and extending from the first end to the second end, and a reverse part in thermal contact with the cable, the reverse part extending from the second end to the first end and ending at the outlet. The forward part and the reverse part together form a continuous fluid path between the inlet and the outlet, so that a working fluid can flow through each cooling tube from the inlet through the forward part and reverse parts to the outlet.

Embodiments of a gas-cooled charging cable are also described. The gas-cooled charging cable includes one or more electrically conductive cables. A thermally conductive sheath sealingly encloses at least part of the one or more cables, wherein there is a sealed volume between an interior surface of the sheath and the exterior surface of the one or more cables, and a thermally conductive and electrically insulating gas occupies the sealed volume.

Embodiments of a vehicle including a gas-cooled charging cable are also described. The vehicle comprises a drivetrain including one or more electric motors coupled to at least one of the vehicle's wheels. A battery is mounted in the vehicle and electrically coupled to the one or more electric motors. A gas-cooled charging cable is mounted in the vehicle and electrically coupled between the battery and a charging port on the vehicle exterior. The charging cable comprises one or more electrically conductive cables, a thermally conductive sheath sealingly enclosing at least part of the one or more cables, wherein there is a sealed volume between an interior surface of the sheath and the exterior surface of the one or more cables, and a thermally conductive and electrically insulating gas occupying the sealed volume.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 7A-7B are a plan view and a cross sectional view of another embodiment of a gas-cooled charging cable, FIG. 7B being a cross-section taken substantially along section line B-B in FIG. 7A.

FIG. 8 is a cross sectional view of another embodiment of a gas-cooled charging cable.

DETAILED DESCRIPTION

Embodiments of liquid-cooled and gas-cooled charging cables are discussed below. In the liquid-cooled embodiments, one or more electrically-conductive cables each have a set of cooling tubes that are positioned in thermal contact with their respective cables. When electricity is flowing through the one or more cables a working fluid, which in one embodiment can be automobile anti-freeze, is circulated through the cooling tubes to cool the cables. Additional elements, such as pumps and heat exchangers, can be used to enhance circulation through the cooling tubes and heat transfer from the system. In the gas-cooled embodiments, at least part of the one or more electrically-conductive cables is sealed within a thermally-conductive sheath such that a sealed volume is created between the outer surface of the one or more cables and the inner surface of the sheath. An electrically insulating but thermally conductive gas is used to fill the sealed volume. When electricity is flowing through the one or more cables heat is transferred from the cables to the thermally conductive gas, from the thermally conductive gas to the thermally-conductive sheath, and from the thermally-conductive sheath to the atmosphere.

Among other things, objects of the disclosed embodiments include allowing charging of electrical vehicles at substantially higher currents, voltages, and powers, hence promoting adoption of electrical vehicles by decreasing their charging time; promoting adoption and use of electric vehicles by improving their performance, safety, and reliability; promoting adoption and use of electric vehicles by reducing their repair costs that can result from thermal issues related to charging; promoting the adoption of electric vehicles by reducing the amount of materials needed, hence reducing the cost; and reducing environmental impacts from needless consumption of raw materials and inefficient use of electricity.

Although the disclosed embodiments are mostly described as being used in a fully electric vehicle, in other embodiments the disclosed liquid- and gas-cooled charging cables can be used in partially electric (i.e., hybrid) vehicles and non-electric vehicles, such as vehicles with a traditional internal combustion engine. And although described mostly in the context of automobiles, the illustrated embodiments can also be used in other vehicles such as trucks, motorcycles, buses, etc.

Figure 1A:
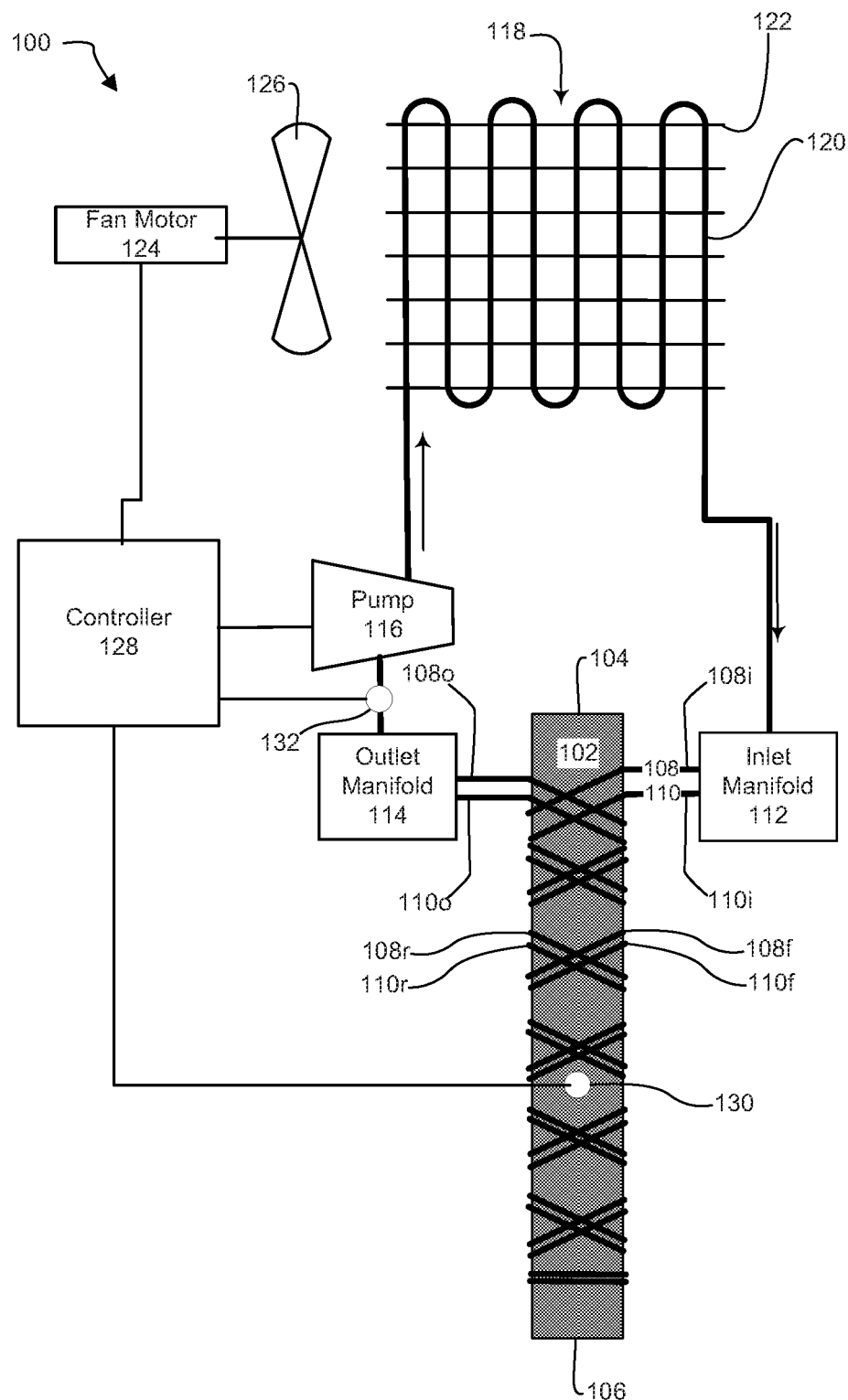
FIGS. 1A-1B are schematic drawings of embodiments of liquid-cooled charging cables.

FIG. 1A illustrates an embodiment of a liquid-cooled charging cable system 100. System 100 includes a cable 102 that is in thermal contact with a set of two cooling tubes 108 and 110. Cooling tubes 108 and 110 are fluidly coupled to the outlet of inlet manifold 112 and to the inlet of outlet manifold 114. As used herein, the term "fluidly coupled" means coupled in such a way that fluid can be exchanged. Outlet manifold 114 is fluidly coupled to pump 116, which in turn is coupled to the inlet of a heat exchanger 118. The outlet of heat exchanger 118 is fluidly coupled to the inlet of inlet manifold 112. As coupled, then, these components—cooling tubes 108 and 110, inlet manifold 112, outlet manifold 114, pump 116, and heat exchanger 118—form a closed loop through which a working fluid flows to cool cable 102. In the closed loop the working fluid can be at atmospheric pressure or can at a higher or lower pressure than atmospheric.

Cable 102 is an elongated conductor having a first end 104 and a second end 106. Cable 102 can be made of any electrically-conducting material; examples include copper, aluminum, iron, etc. A set of one or more cooling tubes are positioned in thermal contact with cable 102. The illustrated set has two cooling tubes 108 and 110, but in other embodiments the set can have more or less cooling tubes than shown.

Each cooling tube has an inlet, a forward part, a reverse part, and an outlet. The forward and reverse parts form a continuous (i.e., uninterrupted) channel through with the working fluid can flow from the inlet to the outlet. In the illustrated embodiment, cooling tubes 108 and 110 have inlets 108$i$ and 110$i$ fluidly coupled to inlet manifold 112. Forward parts 108$f$ and 110$f$ are then helically wound around cable 102 from at or near first end 104 to a position at or near second end 106. Reverse parts 108$r$ and 110$r$ are helically wound from at or near second end 106 to a position at or near first end 104, where reverse part 108$r$ becomes outlet 108$o$ and reverse part 110$r$ becomes outlet 110$o$. Outlets 108$o$ and 110$o$ are then fluidly coupled to outlet manifold 114. In one embodiment cooling tubes 108 and 110 are made of electrically insulating but thermally conducting material; examples of materials that can be used for cooling tubes 108 and 110 include semiconductor materials, ceramics, Teflon, graphite, or graphene.

Inlet manifold 112 is fluidly coupled to inlets 108$i$ and 110$i$, while outlet manifold 114 is coupled to outlets 108$o$ and 110$o$. In the illustrated embodiment, both inlet manifold 112 and outlet manifold 114 are illustrated as fluid chambers, but in other embodiments one or both of inlet manifold 112 an outlet manifold 114 can take a different form. For instance, in one embodiment inlets 108$i$ and 110$i$ can be fluidly coupled to the outlet of heat exchanger 118 using a serious series of T-fittings or Y-fittings. Similarly, outlet manifold 114 outlets 108$o$ and 110$o$ can be fluidly coupled to the inlet of pump 116 using a series of T-fittings or Y-fittings.

Pump 116 is fluidly coupled to outlet manifold 114 and heat exchanger 118, so that the pump draws working fluid from outlet manifold 114 and pumps it into and through heat exchanger 118. In other embodiments pump 116 can instead be fluidly coupled to the outlet of heat exchanger 118 and the inlet of inlet manifold 112, so that it draws working fluid out of heat exchanger 118 and pumps it into inlet manifold 112. In one embodiment pump 116 can be a centrifugal pump including a motor and an impeller, but in other embodiments other types of pumps, such as a piston pump, can be used.

Heat exchanger 118 is fluidly coupled to pump 116 and to inlet manifold 112 such that pump 116 circulates hot working fluid through tubes 120. Fins 122 are thermally coupled to tubes 122 to transfer heat out of the working fluid so that the temperature of working fluid flowing into inlet manifold 112 is substantially lower than the temperature of working fluid exiting outlet manifold 114. A fan including fan motor 124 and fan blades 126 is positioned so that it can direct airflow through heat exchanger 118, thus enhancing convection through the heat exchanger and increasing its heat transfer. Although in the illustrated embodiment heat exchanger 118 is a tube-and-fin type heat exchanger, also sometimes referred to as a radiator, but other embodiments can use other types of heat exchangers, for instance tube-and-shell heat exchanger.

To help control cooling of cable 102, a controller 128 is communicatively coupled to pump 116, fan motor 124, and at least one of temperature sensors 130 and 132. In one embodiment, controller 128 is a computer including at least a microprocessor, memory, and storage. Controller 128 also includes instructions stored thereon to control the cooling system.

By directly measuring the temperature of cable 102 with temperature sensor 130, or by measuring the temperature of the coolant (i.e., the working fluid) leaving outlet manifold 114, controller 128 can adjust the speed of components in the system, thus adjusting the rate of heat transfer as needed to maintain a set temperature. For instance, controller 128 can increase the speed of pump 116 to increase the flow rate of coolant (i.e., working fluid) through the system. Controller 128 can also increase or decrease the speed of fan 124 to adjust the flow rate of air pushed through radiator 118 by fan blades 126, thus increasing or decreasing convection and heat transfer by heat exchanger 118.

Figure 1B:
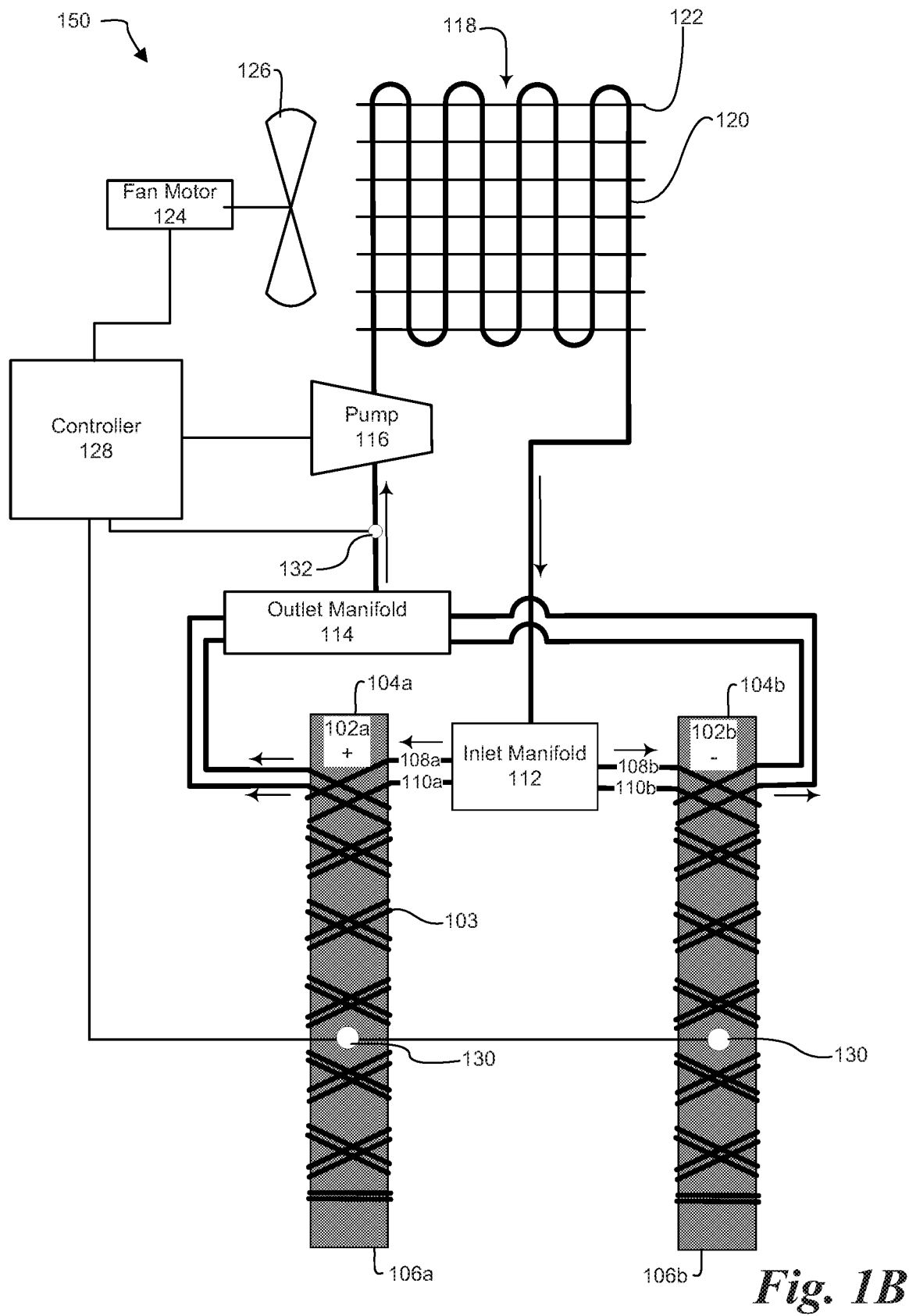

FIG. 1B illustrates another embodiment of a liquid-cooled charging cable system 150. System 150 is in many respects similar to system 100. The primary difference between systems 150 and 100 is that system 150 uses multiple cables: instead of a single cable 102, system 150 uses a pair of cables 102a and 102b. Such an arrangement can be useful in an embodiment where cables 102a and 102b are to be used for charging with direct current (DC), in which case cables 102a and 102b can be used to carry current in opposite directions; this is usually described as one cable being positive (+), the other negative (−).

Each cable 102a and 102b has a corresponding set of cooling tubes in thermal contact with it. In the illustrated embodiment, each cable has a set of two cooling tubes: cable 102a has cooling tubes 108a and 110a, and cable 102b has cooling tubes 108a and 110a. In other embodiments, the set of cooling tubes for each cable can have more or less cooling tubes than shown, and in other embodiments each set of cooling tubes need not have the same number of cooling tubes. Each cooling tube 108a and 108b has substantially the same attributes and fluid couplings described above for cooling tube 108, and similarly each cooling tube 110a and 110b has substantially the same attributes and fluid couplings described above for cooling tube 110.

Figure 2:
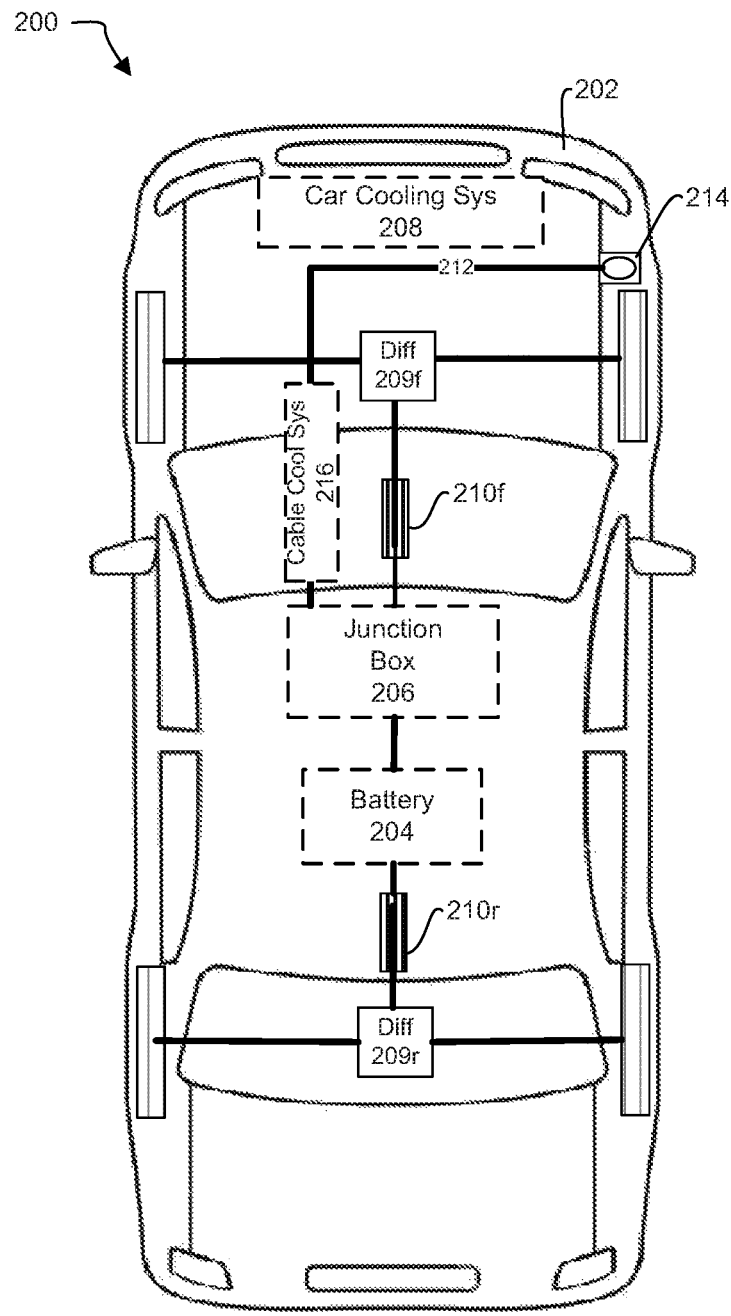
FIG. 2 is a block diagram of an automobile including an embodiment of an onboard liquid-cooled charging cable.

FIG. 2 illustrates an embodiment of a vehicle 200 that includes an onboard liquid-cooled charging cable. In the illustrated embodiment, vehicle 200 is an electric passenger car, but in other embodiments it can be other another type of electric vehicle such as a truck. In still other embodiments, it can be a partially electric (i.e., hybrid) vehicle or a non-electric vehicle such as a vehicle with a traditional internal combustion engine. And although illustrated as a passenger vehicle, in other embodiments vehicle 200 can be another type of vehicle such as a truck, a motorcycle, a bus, etc.

Vehicle 200 has a body 202 and a drivetrain with at least one electric motor coupled to the car's wheels. In the illustrated embodiment, electric motors 210f and 210r are coupled to all four of the vehicle's wheels via differentials 209f and 209r, respectively, but in other embodiments not all the car's wheels need have a corresponding electric motor.

Vehicle 202 also includes a vehicle cooling system 208 which can be used to cool the car's systems such as electric motors 210f and 210r, other electronics, or systems within the car's passenger cabin. Vehicle 200 also includes a battery 204 electrically coupled to a junction box 206.

Generally the electrical path for charging the battery 204 has two parts: an external part from an external charger to a charging port or receptacle 214 on the vehicle exterior, and an internal part from the charging port or receptacle 214 to battery 204, either directly or through intervening electrical components. In vehicle 200, charging cable 212 makes up the internal portion of the battery charging path. Cable 212 is replaceably mounted in vehicle 202 and is electrically coupled between charging port 214 and battery 204 through junction box 206. Junction box 206 is used to condition electrical energy and direct it to the appropriate components in the car. When the vehicle is running, for instance, the junction box can convert direct current from battery 204 into alternating current and direct the alternating current to electric motors 210a-210d, vehicle cooling system 208, other electronic systems in the car, etc. When the vehicle is being charged, junction box 206 directs the electricity flowing through cable 212 to battery 204. Charging cable 212 is a liquid cooled cable that, together with its cooling system 216, can in one embodiment be a standalone system such as the ones shown in FIGS. 1A-1B. In other embodiments, charging cable 212 can be cooled with a combination of its own cable cooling system 216 and the vehicle cooling system 208 (see FIG. 3). In still other embodiments, charging cable 212 can be any of gas-cooled charging cables 600, 700, or 800 shown in FIG. 6A et seq.

Figure 3:
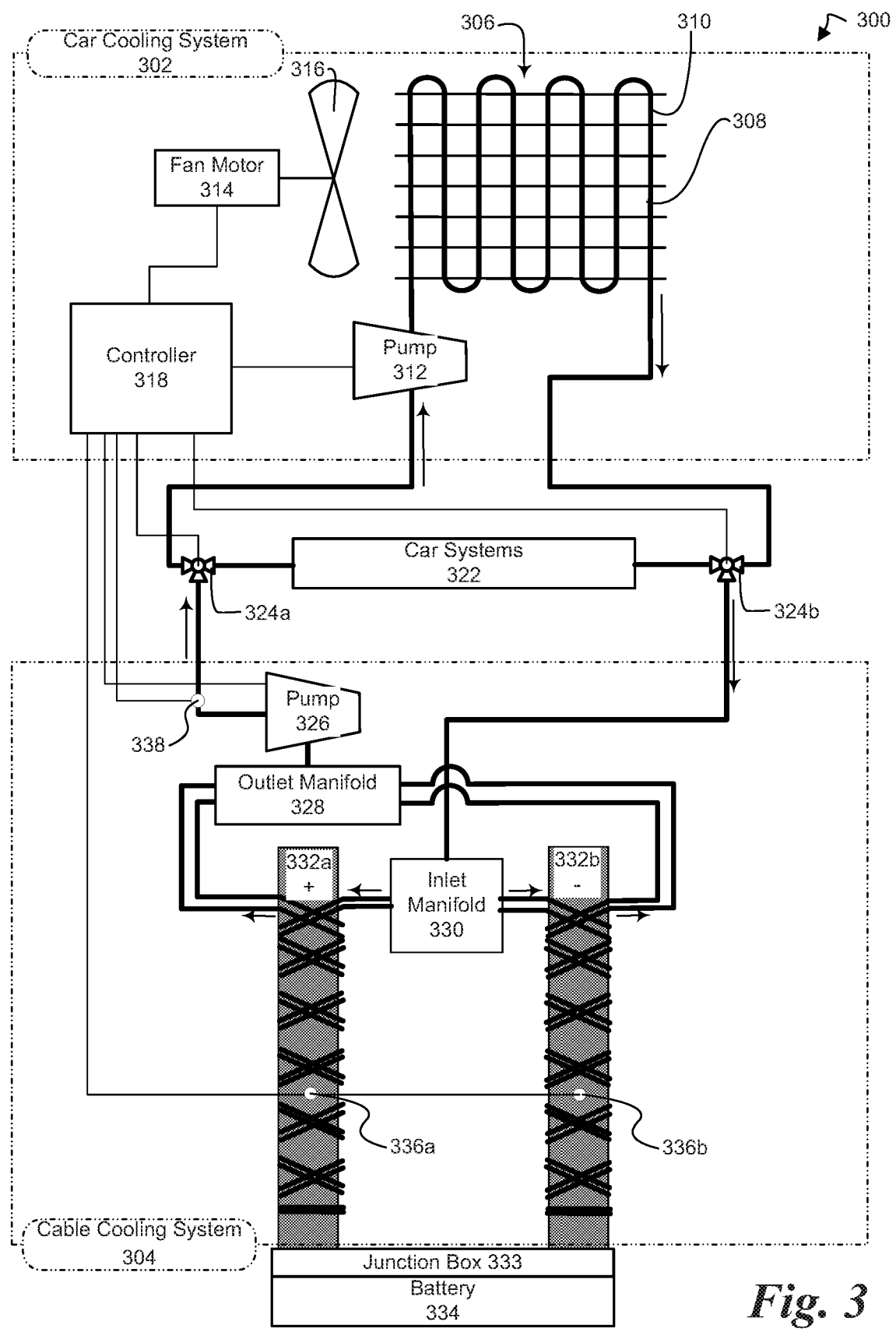
FIG. 3 is a block diagram of an automobile embodiment of a liquid-cooled charging cable.

FIG. 3 illustrates an embodiment of a liquid-cooled charging cable system 300 adapted for direct current (DC) charging of an electric vehicle battery. Although the illustrated embodiment is an electric car, other embodiments could be partially electric (i.e., hybrid) cars or standard gasoline-powered cars (in which case the charging cable could be used to charge a standard car battery). System 300 combines elements of a cable cooling system 304 and a vehicle cooling system 302.

Vehicle cooling system 302 includes a heat exchanger 306 with a pump 312 fluidly coupled to its inlet so that the heat exchanger receives hot working fluid from pump 312 and circulates the working fluid through tubes 308. Fins 310 are thermally coupled to tubes 308 to transfer heat out of the working fluid so that the temperature of the working fluid flowing into inlet manifold 330 is substantially lower than the temperature of the working fluid exiting outlet manifold 328. A fan including fan motor 314 and fan blades 316 is positioned so that it can direct airflow through heat exchanger 306, thus enhancing convection through the heat exchanger and increasing the amount of heat it can transfer away from the working fluid flowing through tubes 308. Although in the illustrated embodiment heat exchanger 118 is a tube-and-fin type heat exchanger, also sometimes referred to as a radiator, other embodiments can use other types of heat exchangers, for instance a tube-and-shell heat exchanger.

Vehicle systems 322—which can, for instance, include the electric motors that make up the car's drivetrain, air conditioning, cabin electronics, and so on—are fluidly coupled to the inlet of pump 312 and the outlet of heat exchanger 306, thus forming a closed loop through which working fluid (e.g., automobile antifreeze) can circulate to remove heat from vehicle systems 322 and transfer the heat to heat exchanger 306, where the heat can be dissipated into the atmosphere. In the closed loop the working fluid can be at atmospheric pressure or can at a higher or lower pressure than atmospheric. A pair of electronically-controllable valves 324a and 324b are fluidly coupled in the fluid connection: valve 324a is positioned in the fluid connection between vehicle systems 322 and pump 312, and valve 324b is positioned in the fluid connection between the outlet of heat exchanger 306 and vehicle systems 322.

Cable cooling system 304 includes some of the elements of cable cooling system 150. Cable cooling system 304 uses a pair of cables 332a and 332b for charging with direct current (DC), in which case cables 332a and 332b can be used to carry current in opposite directions; in the illustrated embodiment cable 332a is positive (+) and cable 332b is negative (−). Cables 332a and 332b are electrically coupled to battery 334 via junction box 333.

As in system 150, each cable 332a and 332b has a corresponding set of cooling tubes that are in thermal contact with the cable. In the illustrated embodiment, cables 332a and 332b each have a set of two cooling tubes, but in other embodiments each set of cooling tubes can have more or less cooling tubes than shown, and in other embodiments each set need not have the same number of cooling tubes. Each cooling tube in both sets of cooling tubes can have substantially the same attributes and fluid couplings described for cooling tubes 108 and 110 in systems 100 and 150. The inlets of the cooling tubes are fluidly coupled to inlet manifold 330, and the outlets of the cooling tubes are fluidly coupled to outlet manifold 328. Inlet manifold 330 and outlet manifold 330 can have the same attributes as the inlet and outlet manifolds of systems 100 and 150.

Outlet manifold 328 is fluidly coupled to valve 324a and inlet manifold 330 is fluidly coupled to valve 324b. If needed to provide additional circulation of the working fluid, an additional pump 326 can be fluidly coupled in the fluid connection between outlet manifold 328 and valve 324a. In other embodiments, if pump 326 is present it can be fluidly coupled in the fluid connection between valve 324b and inlet manifold 330.

To help control cooling of cables 332a and 332b, a controller 318 is communicatively coupled to pump 312, pump 326 if present, fan motor 314, valves 324a and 324b, and at least one of temperature sensors 336a, 336b, and 338. In one embodiment, controller 318 is a computer including at least a microprocessor, memory, and storage. Controller 318 also includes instructions stored thereon to control the cooling system. When the vehicle is being operated and the battery 334 is not being charged, valves 324a and 324b can be set by controller 318 to direct the flow of working fluid through vehicle systems 322 while closing off any flow into or out of cable cooling system 304

During charging of battery 334, when the vehicle is not in operation, controller 318 can set valves 324a and 324b so that pump 312, and pump 326 if present, will bypass vehicle systems 322 and instead circulate working fluid through cable cooling system 304 and heat exchanger 306. By measuring the temperature of cables 332a and 332b with temperature sensors 336a or 336b, or by measuring the temperature of the coolant (i.e., the working fluid) leaving outlet manifold 328 with temperature sensor 338, controller 318 can adjust the speed of components in the system, thus adjusting the rate of heat transfer from cables 332a and 332b. For instance, to increase or decrease the flow rate of coolant through the system, controller 318 can increase or decrease the speed of pump 312 and, if present, pump 326. Alternatively, or in addition, controller 318 can increase or decrease the speed of fan motor 314 to adjust the flow rate of air pushed through heat exchanger 306 by fan blades 316, thus increasing or decreasing convection and heat transfer by heat exchanger 118.

Figures 4A, 4B:
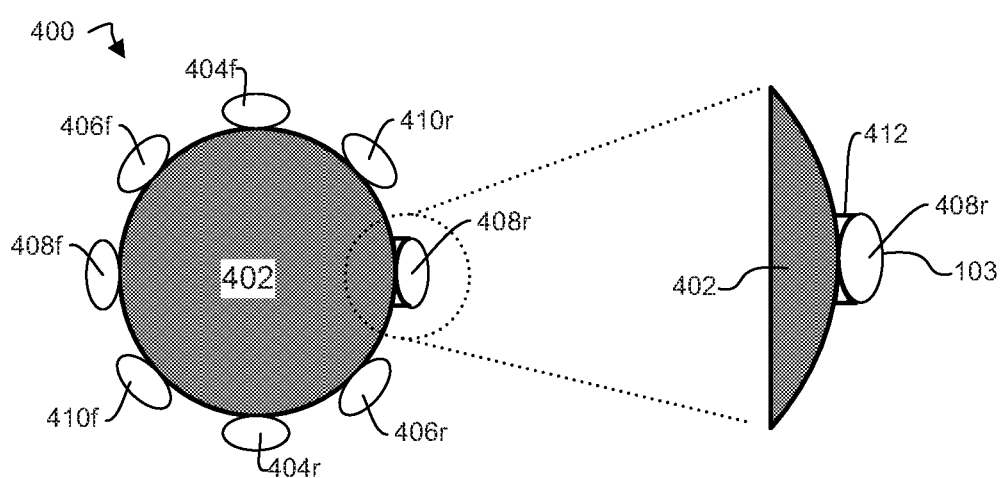
FIG. 4A is a cross-sectional drawing of an embodiment of a liquid-cooled charging cable.
FIG. 4B is an enlarged cross-sectional drawing of an embodiment of the interface between a conductor and a cooling tube, as shown in the circled area in FIG. 4A.

FIGS. 4A-4B illustrate cross-sectional views of a cable 402 and its set of cooling tubes. Cable 402 can be made of a conductor such as copper or aluminum and in the illustrated embodiment has a round cross-sectional shape, although other embodiments of cable 402 can have different cross-sectional shapes than shown.

Cooling tubes 404-410 are positioned around the exterior circumference of cable 402 so that they are in thermal contact with the cable and heat can easily be transferred from cable 402 into the working fluid flowing through the cooling tubes. Each cooling tube 404-410 has a forward part in which fluid flows from a first end of the cable to a second end, and a reverse part in which fluid flows from the second end of the cable back to the first end. In the illustrated embodiment, for instance, cooling tube 404 has forward part 404f and reverse part 404r, cooling tube 406 includes forward part 406f and reverse part 406r, and so on. The forward and reverse parts of each cooling tube together form a continuous (i.e., uninterrupted) channel through which the working fluid can flow from an inlet located at the first end of the cable to an outlet also located at the first end of the cable.

Because each cooling tube 404-410 includes both forward and reverse parts, when viewed in cross section most embodiments will appear to have an even number of cooling tubes. In the illustrated embodiment, each forward part is diametrically opposite to its corresponding reverse part (e.g., forward part 404f and reverse part 404r are diametrically opposite each other), but in other embodiments, when viewed in cross-section, the forward and reverse parts of the cooling tubes can be at circumferential positions other than diametrically opposite. For instance, the forward and reverse parts of each cooling tube could be positioned adjacent to each other, or could be positioned at an angle between 0 and 180 degrees, as measured from the center of cable 402, relative to each other (180 degrees would be diametrically opposite).

In the illustrated embodiment, cooling tubes 404-410 have elliptical cross-sectional shapes that increase the contact area between cooling tubes 404-410 and cable 402 and enhance heat transfer between the two. Cooling tubes 404-410 can have an elliptical cross section to begin with, or can start with a different cross-sectional shape, such as circular, and be deformed into an elliptical shape when being joined to cable 102. The cooling tubes can be joined to the cable by various methods, such as soldering. In other embodiments, other cross-sectional shapes can be used for cooling tubes 404-410 and, in still other embodiments, all of cooling tubes 404-410 need not have the same cross-sectional shape.

FIG. 4B is an enlargement illustrating how cooling tube 408r, the reverse part of cooling tube 408, is joined to cable 402. To further enhance heat transfer from the cable to the working fluid flowing in cooling tube 408r, a thermal interface material 412 can be applied between cable 402 and the tube. Although illustrated only for cooling tube 408r, in other embodiments thermal interface material 412 can be used together with any number of cooling tubes 404-410, up to and including all of them. In still other embodiments, to tailor the heat transfer thermal interface material 412 can be applied between all forward parts 404f-410f and cable 402 but not the reverse parts, or can be applied between all reverse parts 404r-410r and cable 402 but not the forward parts.

Figure 5A:
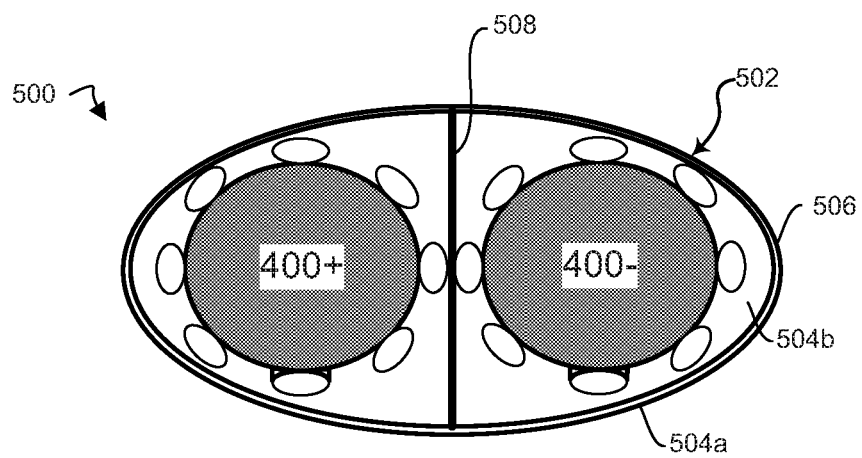
FIGS. 5A-5B are a cross-sectional drawings of embodiments of a cable using multiple liquid-cooled conductors.

FIG. 5A illustrates an embodiment of a two-cable arrangement 500. Cable 500 can be used for direct current (DC) charging and includes two cables 400: cable 400+ carrying current in one direction, and cable 400− carrying current in the opposite direction. Cables 400+ and 400− are surrounded by a sheath 502 to protect the cables themselves and to prevent other items, for example other parts in vehicle 200, from coming into contact with the cables and causing an electrical short circuit. In one embodiment sheath 502 can include a layer of metal foil or mesh 506 interposed between layers 504a and 504b of an electrically insulating material such as rubber, so that in addition to providing electrical insulation the sheath provides shielding from electromagnetic interference. In other embodiments of sheath 502, foil or mesh layer 506, and possibly one of layers 504a and 504b, can be omitted so that the sheath is made entirely of an electrically insulating material such as rubber. An electrically insulating membrane 508 can also be put inside the sheath to separate cable 400+ from cable 400−, thus preventing any electrical contact between the two.

Figure 5B:
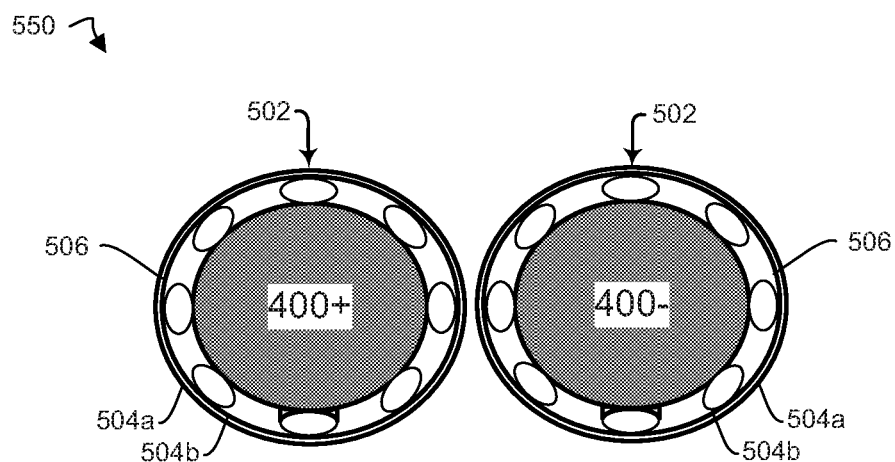
Figure 6A:
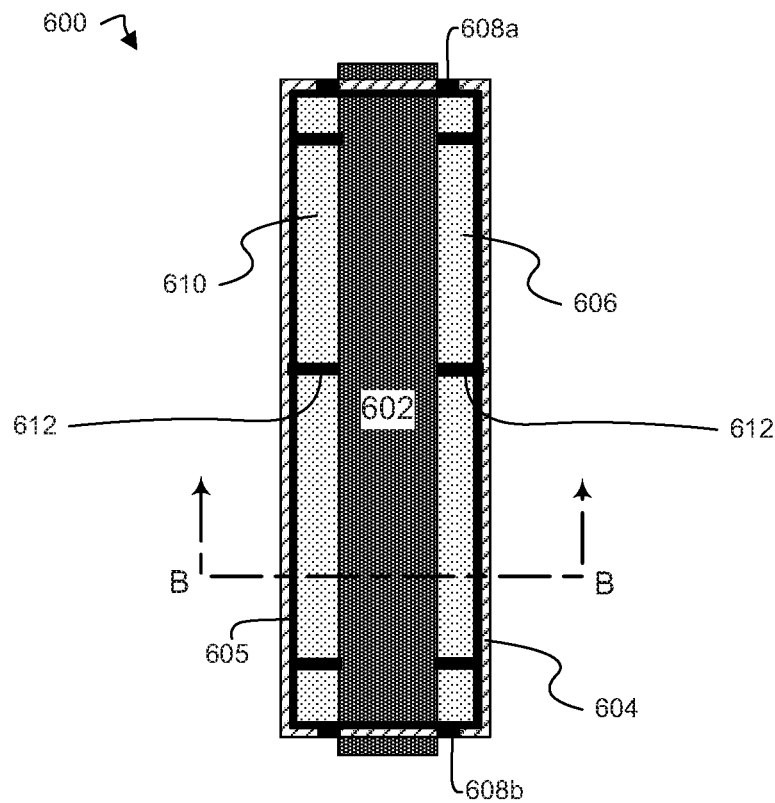
FIGS. 6A-6B are a plan view and a cross sectional view of an embodiment of a gas-cooled charging cable, FIG. 6B being a cross-section taken substantially along section line B-B in FIG. 6A.
Figure 6B:
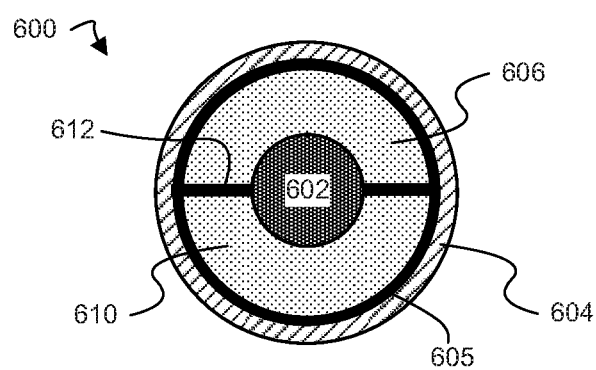

FIG. 5B illustrates another embodiment of a two-cable arrangement 550. Cable 550 can be used for direct current (DC) charging and includes two cables 400: cable 400+ carrying current in one direction, and cable 400− carrying current in the opposite direction. Cable 550 differs from cable 500 primarily in that in cable 550, each of cables 400+ and 400− is surrounded by its own separate sheath 502 rather than a single sheath surrounding both cables 400+ and 400−. Sheaths 502 protect the cables themselves and prevent cables 400+ and 400− and other items, for example other parts in vehicle 200, from coming into contact with the cables and causing an electrical short circuit. Each sheath 502 in cable 550 can have any of the attributes described above for sheath 502 in FIGS. 6A-6B together illustrate an embodiment of a gas-cooled charging cable 600; FIG. 6A is a plan view, FIG. 6B a cross-section taken substantially along section line B-B. Gas-cooled charging cable 600 includes a cable 602 positioned within a thermally conductive sheath 604. Thermally conductive sheath 604 can be made of a metal such as copper, or of a thermally conductive and flexible non-metal such as plastic. One or more spacers 612 can be positioned between charging cable 602 and sheath 604 to prevent contact between them. A membrane or liner 605 is positioned along the interior surface of sheath 604, among other things to prevent contact between cable 602 and the sheath. In an embodiment where sheath 604 is made of an electrically conductive metal, liner 605 can be made of an electrically insulating material; examples of materials for liner 605 include rubber, Teflon, carbon, graphite, graphene, and woven wool. In an embodiment where sheath 604 is made of a material that is not thermally conductive, such as a plastic, liner 605 can be made of a substance that prevents leakage or diffusion of gas 610.

The end caps of sheath 604 include seals 608a and 608b that both separate and electrically insulate cable 602 from metal sheath 604 and provide a seal so that volume 606 between the exterior of cable 602 and the interior of sheath 604 becomes sealed. A thermally conductive but electrically insulating gas 610 can then be pumped into, and sealed within, volume 606. In addition to being electrically insulating and thermally conductive, gas 610 should not be flammable, explosive or corrosive. In one embodiment gas 610 can be automotive-grade Argon, but in other embodiments gas 610 can be another gas such as nitrogen, oxygen, and propylene.

In operation, current flowing through cable 602 causes the cable to become hot, but because thermally conductive gas 610 is in contact with cable 602, it conducts a substantial amount of heat away from cable 602, through metal sheath 604, and into the atmosphere surrounding sheath 604.

FIGS. 7A-7B together illustrate an embodiment of a gas-cooled charging cable 700; FIG. 7A is a plan view, FIG. 7B a cross-section taken substantially along section line B-B. The primary difference between gas-cooled cables 600 and 700 is that gas-cooled cable 700 is a multi-cable arrangement. Gas-cooled charging cable 700 includes a pair of cables 702a and 702b that conduct current in different directions; for instance, cable 702a can be considered positive and cable 702b negative. Both cables 702a-702b are positioned within a thermally conductive sheath 704. Thermally conductive sheath 604 can be made of a metal such as copper, or of a thermally conductive and flexible non-metal such as plastic. An electrically insulating membrane 713 spanning the length and inner diameter of sheath 704 can be positioned between cables 702a and 702b to prevent contact between the two that could result in an electrical short circuit. A membrane or liner 705 is positioned along the interior surface of sheath 704, among other things to prevent contact between cables 702a and 702b and sheath 704. In an embodiment where sheath 704 is made of an electrically conductive metal, liner 705 can be made of an electrically insulating material; examples of materials for liner 705 include rubber, Teflon, carbon, graphite, graphene, and woven wool. In an embodiment where sheath 704 is made of a material that is not thermally conductive, such as a plastic, liner 705 can be made of a substance that prevents leakage or diffusion of gas 710 from the interior of sheath 704.

The end caps of sheath 704 include seals 708a and 710a that separate and electrically insulate cable 702a from sheath 704, and also include seals 708b and 710b that separate and electrically insulate cable 702b from metal sheath 704. Seals 708a-708b and 710a-710b also provide a seal so that volume 706, between the exteriors of cables 702a and 702b and the interior of sheath 704, becomes sealed. Spacers 712 can also be positioned between charging cable 702a and 702b and sheath 704 to prevent contact between those elements.

A thermally conductive but electrically insulating gas 710 can then be pumped into, and sealed within, volume 706. In addition to being electrically insulating and thermally conductive, gas 710 should not be flammable, explosive or corrosive. In one embodiment gas 710 can be automotive-grade Argon, but in other embodiments gas 710 can be another gas such as nitrogen, oxygen, and propylene. In operation, current flowing through cables 702a and 702b causes the cables to become hot, but because thermally conductive gas 710 is in contact with the cables 702a and 702b, it conducts a substantial amount of heat away from the cable, through metal sheath 604, and into the atmosphere surrounding sheath 704.

FIG. 8 illustrates another embodiment of a gas-cooled charging cable 800 but instead of putting two cables within a single sheath as in cable 700, cable 800 results from joining together two charging cables 600. In one of the charging cables 600, cable 602a conducts current in one direction and in the other charging cable 600 another cable 602b conducts current in an opposite direction. As in charging cable 600, cables 602a and 602b are positioned within their own sheath 604 and the volume 606 between cables 602a and 602b and their respective sheaths is filled with an electrically insulating but thermally conductive gas. One or more separators 802 can be positioned along the length of the cables 600 to keep the cables together yet separated by a fixed distance.

The above description of embodiments, including what is described in the abstract, is not intended to be exhaustive or to limit the invention to the described forms. Specific embodiments of, and examples for, the invention are described herein for illustrative purposes, but various equivalent modifications are possible within the scope of the invention in light of the above detailed description, as those skilled in the relevant art will recognize.

What is claimed is:

1. An apparatus comprising:
   one or more cables, each cable being electrically conductive and having a first end and a second end;
   a set of cooling tubes corresponding to each cable, each set including at least two cooling tubes, wherein each of the at least two cooling tubes includes:
      an inlet and an outlet, both positioned at the first end of the cable,
      a forward part in thermal contact with the cable, the forward part beginning at the inlet and extending from the first end to the second end, and
      a reverse part in thermal contact with the cable, the reverse part extending from the second end to the first end and ending at the outlet,
   wherein the forward part and the reverse part together form a continuous fluid path between the inlet and the outlet, so that a working fluid can flow through each of the at least two cooling tubes from the inlet through the forward part and the reverse part to the outlet.

2. The apparatus of claim 1, further comprising an inlet manifold fluidly coupled to every inlet and an outlet manifold fluidly coupled to every outlet.

3. The apparatus of claim 2, further comprising:
   a heat exchanger fluidly coupled to the inlet manifold and the outlet manifold;
   a pump fluidly coupled to the heat exchanger and to one of the inlet manifold or the outlet manifold; and
   a fan positioned to create forced convection through the heat exchanger.

4. The apparatus of claim 3, further comprising a temperature sensor coupled to each cable and a controller communicatively coupled to each temperature sensor, to the pump, and to the fan.

5. The apparatus of claim 1 wherein each cooling tube is helically wound around the cable from the first end to the second end and from the second end to the first end.

6. The apparatus of claim 1 wherein the one or more cables includes a pair of cables carrying direct current in opposite directions.

7. The apparatus of claim 6, further comprising a sheath surrounding the pair of cables and their corresponding sets of cooling tubes.

8. The apparatus of claim 1 wherein the cooling tubes are made of a thermally conductive but electrically insulating material.

9. The apparatus of claim 8, further comprising a thermal interface material interposed between the cooling tube and the cable.

10. A vehicle comprising:
    a drivetrain including one or more electric motors coupled to at least one of the vehicle's wheels;
    a battery mounted in the vehicle and electrically coupled to the one or more electric motors;
    a charging cable mounted in the vehicle and electrically coupled between the battery and a charging port on the vehicle exterior, the charging cable comprising:
       one or more cables, each cable being electrically conductive and having a first end and a second end;
       a set of cooling tubes corresponding to each cable, each set including at least two cooling tubes, wherein each of the at least two cooling tubes includes:
          an inlet and an outlet, both positioned at the first end of the cable,
          a forward part in thermal contact with the cable, the forward part beginning at the inlet and extending from the first end to the second end, and
          a reverse part in thermal contact with the cable, the reverse part extending from the second end to the first end and ending at the outlet,
       wherein the forward part and the reverse part together form a continuous fluid path between the inlet and the outlet, so that a working fluid can flow through each of the at least two cooling tubes from the inlet through the forward part and reverse parts to the outlet.

11. The vehicle of claim 10, further comprising an inlet manifold fluidly coupled to each inlet and an outlet manifold fluidly coupled to each outlet.

12. The vehicle of claim 11, further comprising:
    a heat exchanger fluidly coupled to the inlet manifold and the outlet manifold;
    a pump fluidly coupled to the heat exchanger and to one of the inlet manifold or the outlet manifold; and
    a fan positioned to create forced convection through the heat exchanger.

13. The vehicle of claim 12 wherein the heat exchanger is the vehicle's radiator.

14. The vehicle of claim 12, further comprising a temperature sensor coupled to each cable and a controller communicatively coupled to each temperature sensor, to the pump, and to the fan.

15. The vehicle of claim 10 wherein each cooling tube is helically wound around the cable from the first end to the second end and is helically wound around the cable from the second end to the first end.

16. The vehicle of claim 10 wherein the one or more cables includes a pair of cables carrying direct current in opposite directions.

17. The vehicle of claim 16, further comprising a sheath surrounding the pair of cables and their corresponding sets of cooling tubes.

18. The vehicle of claim 10 wherein the cooling tubes are made of a thermally conductive but electrically insulating material.

19. The vehicle of claim 18, further comprising a thermal interface material interposed between the cooling tube and the cable.

20. A direct current (DC) charging cable comprising:
    first and second cables, each cable being electrically conductive and having a first end and a second end, wherein the first cable is adapted to carry direct current in a first direction and the second cable is adapted to carry direct current in a second direction, the second direction being opposite the first direction;
    a set of cooling tubes corresponding to each of the first and second cables, each set including at least two cooling tubes, wherein each of the at least two cooling tubes includes:
       an inlet and an outlet, both positioned at the first end of the cable, a forward part in thermal contact with the cable, the forward part beginning at the inlet and extending from the first end to the second end, and a reverse part in thermal contact with the cable, the reverse part extending from the second end to the first end and ending at the outlet, wherein the forward part and the reverse part together form a continuous fluid path between the inlet and the outlet, so that a working fluid can flow through each cooling tube from the inlet through the forward and reverse parts to the outlet; and a sheath surrounding the first and second cables and their corresponding sets of cooling tubes.

21. The DC charging cable of claim 20, further comprising an inlet manifold fluidly coupled to every inlet and an outlet manifold fluidly coupled to every outlet.

22. The DC charging cable of claim 21, further comprising:
a heat exchanger fluidly coupled to the inlet manifold and the outlet manifold;
a pump fluidly coupled to the heat exchanger and to one of the inlet manifold or the outlet manifold; and
a fan positioned to create forced convection through the heat exchanger.

23. The DC charging cable of claim 22, further comprising a temperature sensor coupled to each cable and a controller communicatively coupled to each temperature sensor, to the pump, and to the fan.

24. The DC charging cable of claim 20 wherein each cooling tube is helically wound around the cable from the first end to the second end and is helically wound around the cable from the second end to the first end.

25. The DC charging cable of claim 20 wherein the cooling tubes are made of a thermally conductive but electrically insulating material.

26. The DC charging cable of claim 25, further comprising a thermal interface material interposed between the cooling tube and the cable.

27. A vehicle comprising:
a drivetrain including one or more electric motors coupled to at least one of the vehicle's wheels;
a battery mounted in the vehicle and electrically coupled to the one or more electric motors;
a direct current (DC) charging cable mounted in the vehicle and electrically coupled to the battery and to a charging port, the charging cable comprising:
first and second cables, each cable being electrically conductive and having a first end and a second end, wherein the first cable is adapted to carry direct current in a first direction and the second cable is adapted to carry direct current in a second direction, the second direction being opposite the first direction;
a set of cooling tubes corresponding to each of the first and second cables, each set including at least two cooling tubes, each of the at least two cooling tubes including:
an inlet and an outlet, both positioned at the first end of the cable,
a forward part in thermal contact with the cable, the forward part beginning at the inlet and extending from the first end to the second end, and
a reverse part in thermal contact with the cable, the reverse part extending from the second end to the first end and ending at the outlet,
wherein the forward part and the reverse part together form a continuous fluid path between the inlet and the outlet, so that a working fluid can flow through each cooling tube from the inlet through the forward and reverse parts to the outlet; and
a sheath surrounding the first and second cables and their corresponding sets of cooling tubes.

28. The vehicle of claim 27, further comprising an inlet manifold fluidly coupled to every inlet and an outlet manifold fluidly coupled to every outlet.

29. The vehicle of claim 28, further comprising:
a heat exchanger fluidly coupled to the inlet manifold and the outlet manifold;
a pump fluidly coupled to the heat exchanger and to one of the inlet manifold or the outlet manifold; and
a fan positioned to create forced convection through the heat exchanger.

30. The vehicle of claim 29 wherein the heat exchanger is the vehicle's own radiator.

31. The vehicle of claim 29, further comprising a temperature sensor coupled to each cable and a controller communicatively coupled to each temperature sensor, to the pump, and to the fan.

32. The vehicle of claim 27 wherein each cooling tube is helically wound around the cable from the first end to the second end and is helically wound around the cable from the second end to the first end.

33. The vehicle of claim 27 wherein the cooling tubes are made of a thermally conductive but electrically insulating material.

34. The vehicle of claim 33, further comprising a thermal interface material interposed between the cooling tube and the cable.

35. An apparatus comprising:
one or more electrically conductive cables;
a thermally conductive sheath sealingly enclosing at least part of the one or more electrically conductive cables;
a liner positioned along an interior surface of the thermally conductive sheath,
wherein a sealed volume is between the liner on the interior surface of the sheath and an exterior surface of the one or more electrically conductive cables, and wherein the sealed volume comprises the exterior surface of the one or more electrically conductive cables and the liner on the interior surface of the thermally conductive sheath that is spaced apart from and surrounds the exterior surface;
and
a thermally conductive and electrically insulating gas selected from a group consisting of argon, nitrogen, oxygen, and propylene occupying the sealed volume, so that the thermally conductive and electrically insulating gas is between the exterior surface of the one or more electrically conductive cables and the liner, wherein the liner is to prevent at least one of leakage or diffusion of the thermally conductive and electrically insulating gas from the sealed volume.

36. The apparatus of claim 35 wherein the one or more electrically conductive cables include a first cable to carry current in a first direction and a second cable to carry current in a second direction that is opposite the first direction.

37. The apparatus of claim 36, further comprising an electrically insulating membrane positioned between the first cable and the second cable and spanning the length and inner diameter of the sheath.

38. The apparatus of claim 35 wherein the sealed volume includes one or more end caps between the exterior surface of the one or more electrically conductive cables and the interior surface of the thermally conductive sheath through which the one or more electrically conductive cables pass.

39. The apparatus of claim 38, further comprising electrically insulating seals that separate the one or more electrically conductive cables from the end caps.

40. The apparatus of claim 35 wherein the sheath is made of a metal or a thermally conductive non-metal.

41. A vehicle comprising:
a drivetrain including one or more electric motors coupled to at least one of the vehicle's wheels;
a battery mounted in the vehicle and electrically coupled to the one or more electric motors;
a gas-cooled charging cable mounted in the vehicle and electrically coupled between the battery and a charging port on the vehicle exterior, the charging cable comprising:
one or more electrically conductive cables;
a thermally conductive sheath sealingly enclosing at least part of the one or more electrically conductive cables;
a liner positioned along an interior surface of the thermally conductive sheath,
wherein a sealed volume is between the liner on the interior surface of the sheath and an exterior surface of the one or more electrically conductive cables, and wherein the sealed volume comprises the exterior surface of the one or more electrically conductive cables and the liner on the interior surface of the thermally conductive sheath that is spaced apart from and surrounds the exterior surface; and
a thermally conductive and electrically insulating gas selected from a group consisting of argon, nitrogen, oxygen, and propylene occupying the sealed volume, so that the thermally conductive and electrically insulating gas is between the exterior surface of the one or more electrically conductive cables and the liner, wherein the liner is to prevent at least one of leakage or diffusion of the thermally conductive and electrically insulating gas from the sealed volume.

42. The vehicle of claim 41 wherein the one or more electrically conductive charging cables include a first charging cable to carry current in a first direction and a second charging cable to carry current in a second direction that is opposite the first direction.

43. The vehicle of claim 42, further comprising an electrically insulating membrane positioned between the first cable and the second cable and spanning the length and inner diameter of the sheath.

44. The vehicle of claim 41 wherein the sealed volume includes one or more end caps between the exterior surface of the one or more electrically conductive cables and the interior surface of the thermally conductive sheath through which the one or more charging cables pass.

45. The vehicle of claim 44, further comprising electrically insulating seals that separate the one or more charging cables from the end caps.

46. The vehicle of claim 41 wherein the sheath is made of a metal or a thermally conductive non-metal.

* * * * *